United States Patent Office 3,326,266
Patented June 20, 1967

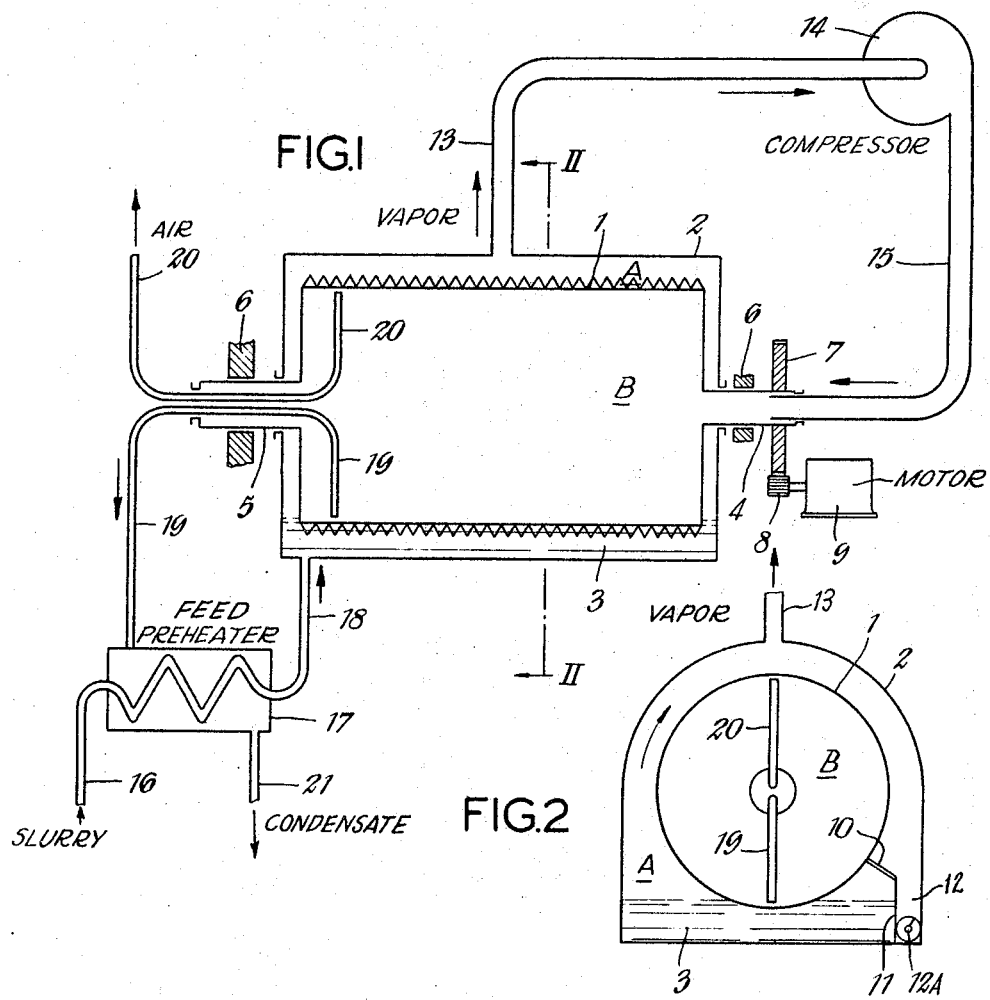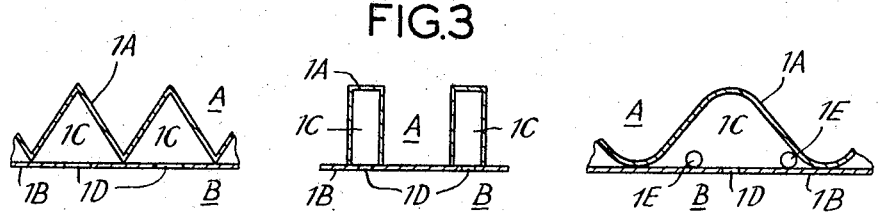

3,326,266
APPARATUS FOR EVAPORATING LIQUID TO SEPARATE SOLID MATERIAL FROM THE LIQUID
John Cannon Braithwaite, Ireleth, and Andrew Campbell Grant and Joseph Hendrick Taylor, Barrow-in-Furness, England, assignors to Vickers-Armstrongs (Engineers) Limited, London, England, a British company
Filed Oct. 20, 1964, Ser. No. 405,162
Claims priority, application Great Britain, Oct. 21, 1963, 41,556/63
6 Claims. (Cl. 159—11)

According to the present invention there is provided an apparatus for evaporating liquid to separate solid material from the liquid, comprising a first chamber, a second chamber disposed in said first chamber, a heat-conducting wall portion common to said first chamber and said second chamber, a liquid inlet of one chamber of said first chamber and said second chamber for conducting into said one chamber said liquid from which said material is to be separated, means for causing said liquid from which said material is to be separated to form a layer of liquid on said wall portion in said one chamber, a vapour outlet of said one chamber for conducting out of said one chamber a vapour formed by evaporation of said liquid in said one chamber, a compressor connected downstream of said vapour outlet for compressing said vapour and thus increasing the temperature thereof, a vapour inlet of the other chamber of said first chamber and said second chamber connected downstream of said compressor for conducting the heated vapour into said other chamber in which said heated vapour condenses on said wall portion and thus causes evaporation of liquid of said layer, a liquid outlet of said other chamber for conducting the condensate out of said other chamber, and removing means operatively associated with said wall portion for removing the solid material remaining after evaporation of the liquid of said layer.

In order that the invention may be clearly understood and readily carried into effect, reference will now be made by way of example to the accompanying drawings, in which:

FIGURE 1 is a diagrammatic representation of an apparatus for evaporating liquid to separate solid material from the liquid, FIGURE 2 is a section on the line II—II of FIGURE 1, and FIGURE 3 illustrates various forms which a detail of the apparatus of FIGURE 1 may take.

The apparatus shown is for evaporating water from cement slurry thereby to produce dry, or substantially dry, raw cement meal. However, it will be understood that the apparatus can be employed to evaporate liquids other than water thereby to separate solid material from the liquid and recover the solid material and/or the liquid. The apparatus includes a cylindrical drum 1 which is mounted for rotation within a fixed casing 2. Thus there are formed two chambers A and B of which chamber B is disposed within chamber A. In the bottom of the chamber A there is shown cement raw meal slurry 3. The drum 1 includes axial end pipes 4 and 5 which extend through glands carried by the casing 2 and are rotatably mounted in bearings 6. A gear wheel 7 is mounted on the pipe 4 and meshes with a pinion 8 which itself is mounted on the shaft of a motor 9. A scraper blade 10 (FIGURE 2) is mounted on an upstanding wall 11 provided within the casing 2. More than one blade 10 may be provided if necessary. The blade 10 contacts the outer surface of the drum 1, and the wall 11 separates a channel portion 12 of the bottom of the chamber A from the remainder of the bottom of the chamber. Conveyor means 12A such as a screw conveyor is provided in the channel portion 12.

A vapour outlet pipe 13 extends from the chamber A and leads to the suction side of a compressor 14. A vapour inlet pipe 15 connects the pressure side of the compressor 14 with the end pipe 4 and hence with the chamber B.

Slurry is fed into the chamber A by way of a pipe 16, a heat exchanger 17 and a liquid inlet pipe 18. Condensate for heating slurry passing through the heat exchanger 17 is fed to the heat exchanger 17 from the chamber B via a fixed liquid outlet pipe 19. The condensate flows from the heat exchanger by way of a pipe 21. The pipe 19 passes through the end pipe 5 of the drum 1, and a further fixed pipe 20 which serves as an air venting pipe for the chamber B also passes through the end pipe 5. It will be noted that within the chamber B the pipe 20 turns upwardly to terminate in the region of the top of the chamber B, and the pipe 19 turns downwardly to terminate adjacent the lowermost portion of the cylindrical wall of the drum 1. An air ejector (not shown) may be provided for reducing the pressure in pipe 20 and creating a suction effect.

Various configurations which the cylindrical wall of the drum 1 may take are shown in FIGURE 3. In each case the drum consists of inner sheeting 1B which is of constant circular cross-section and to the outer surface of which is secured, for example by welding, outer sheeting 1A. The sheeting 1A defines with the sheeting 1B a series of annular closed spaces 1C which extend coaxially around the drum 1. The sheeting 1A may be, for example, in the form of a series of triangular-section projections, a series of rectangular-section projections, or a sinusoidal-like sheet. Ports 1D provided in the sheeting 1B serve to connect the closed spaces 1C with the chamber B.

If desired the sheeting 1B may be replaced by a series of rings and longitudinal members which define a cylinder and to which the sheeting 1A is secured.

To prevent dirt and scale accumulating within the spaces 1C on the sheeting 1A, pieces of material of any convenient shape and composition, for example steel balls 1E, may be introduced into the spaces 1C, either permanently, or at intervals when it is desired to clear away scale and dirt. Upon rotation of the drum 1 the balls or other pieces have a scouring effect on the sheeting 1A.

A nozzle (not shown) is provided in the pipe 15 for discharging steam into the pipe 15 from a source of steam (not shown).

In use of the apparatus shown, cold slurry is pumped through the pipe 16, the heat exchanger 17 and the pipe 18 into the chamber A, and fills the chamber A to such an extent, as will clearly be seen from FIGURE 2, that the lowermost portion of the drum 1 dips into the slurry. The drum 1 is rotated by the motor 9 in the direction indicated by the arrow in FIGURE 2 and a layer of slurry is picked up by the drum 1 as it rotates. At this time the compressor 14 is extracting air from the chamber A via the pipe 13, compressing the air, thereby increasing its temperature, and delivering the compressed air to the chamber B via the pipe 15. Air entering the chamber B in this manner gives up some of its heat to the drum 1 and is extracted from the chamber B through the pipe 20.

As the temperature of the drum 1 increases, the layer of slurry adhering to the outer surface of the cylindrical wall of the rotating drum is heated and the water content begins to evaporate. Thus the proportion of steam to air in the chamber A increases and consequently the proportion of steam to air fed to the compressor also increases. Eventually substantially all the air in the chamber A is extracted and expelled from the apparatus via the compressor 14, the chamber B and the pipe 20, and the chamber A becomes steam filled. The compressor 14, by compressing steam extracted from the chamber A, raises the saturation pressure and temperature of the steam. The compressed, and hence heated, steam entering pipe 15 from the compressor passes into the chamber B where it condenses on the inside of the drum and gives up its latent heat which passes outwardly through the walling of the drum 1 to evaporate further water from the slurry. The condensate in the drum 1 soon covers the open mouth of the downwardly directed pipe 19 and if the pressure prevailing in the drum 1 is high enough the condensate will be forced along the pipe 19 and into the heat exchanger 17. If such pressure is not high enough to force the condensate along the pipe 19 and into the heat exchanger 17, then flow may be assisted by a pump (not shown). This condensate gives up sensible heat to the incoming slurry so that the slurry is heated before reaching the chamber A. The condensate leaves the heat exchanger 17 through the pipe 21.

It will be understood that, when any of the constructional forms shown in FIGURE 3 are employed, the steam entereing the drum 1 from the pipe 15 passes through the ports 1D and enters the spaces 1C, heat from the condensing steam passing through the sheeting 1A to the layer of slurry which adheres to the outer surfaces of the sheeting 1A.

The dry slurry which adheres to the cylindrical wall of the drum after the moisture has been evaporated therefrom is scraped off the drum 1 by the, or each, scraper blade 10, the dried slurry entering the channel portion 12 and being conveyed from the chamber A by the screw conveyor 12A. It will be understood that the, or each, scraper blades 10 has a configuration which depends on the form of drum 1. Thus the, or each, blade 10 may be provided with, for example, serrated or sinusoidal edge configurations.

It will be understood that, if it is desired to accelerate the start-up procedure described, steam or heat from an independent source (not shown) may be introduced into the circuit during starting up via, for example, said nozzle provided in pipe 15.

It will be further understood that the heat added to the system by the compressor 14 is sufficient to provide adequate temperature differences across the cylindrical wall of the drum, and also to make up the various heat losses to the circuit. However, if desired, the power of the compressor may be reduced to such a point that it is insufficient to make up the heat losses, the heat deficit then being made up by injecting heat to the circuit in the form of, for example, steam or hot water at any convenient point, for example, through said nozzle.

As regards the heat exchanger 17 this serves to recover a part of the sensible heat in the condensate. In the event that the drum 1 is so designed that it is capable of recovering said part of the sensible heat in the condensate the heat exchanger 17 may be reduced in size or omitted altogether. If desired the heat lost in the condensate may be made up by other means, for example, by increasing the compressor power or by injecting steam from an independent source (not shown) into the pipe 15 via said nozzle.

Should it be desired to accelerate starting, or to reduce the compressor power, it is also possible to insert into the line 18 an independently fired heater to preheat further the slurry flowing to the chamber A.

We claim:

1. An apparatus for evaporating liquid to separate solid material from said liquid, comprising a heat-conducting cylindrical wall rotatable about its axis of revolution which is substantially horizontal, a first chamber bounded in part by the outside peripheral surface of said wall and by a surrounding casing, a second chamber bounded by the inside peripheral surface of said wall and disposed therewithin, portions of said wall having a structure defining annular closed spaces located in said wall structure and co-axial with said wall, portions of said wall defining ports interconnecting said spaces with said second chamber, a liquid inlet of said first chamber for conducting said liquid, from which said material is to be separated, into said first chamber to fill said first chamber up to a level at which said liquid contacts the lowermost portion of said wall, driving means for turning said wall about said axes to cause said liquid from which said material is to be separated to form a layer of liquid on said wall in said first chamber, a vapour outlet of said first chamber for conducting out of said first chamber a vapour formed by evaporation of said liquid in said first chamber, a compressor connected downstream of said vapour outlet for compressing said vapour and thus increasing the temperature thereof, a vapour inlet of said second chamber connected downstream of said compressor for conducting the heated vapour into said second chamber in which said heated vapour condenses on said wall portion and thus causes evaporation of liquid of said layer, a liquid outlet of said second chamber for conducting the condensate out of said second chamber, and scraper means mounted in said first chamber adjacent to said wall and extending axially along said wall but angularly displaced from said lowermost portion for scraping from said wall on turning of said wall, the solid material remaining on said wall after evaporation of the liquid of said layer.

2. An apparatus for evaporating liquid to separate solid material from said liquid, comprising a heat-conducting cylindrical wall rotatable about its axis of revolution which is substantially horizontal, a first chamber bounded in part by the outside peripheral surface of said wall and by a surrounding casing, a second chamber bounded by the inside peripheral surface of said wall and disposed therewithin, portions of said wall having a structure defining annular closed spaces located in said wall structure and co-axial with said wall, portions of said wall defining ports interconnecting said spaces with said second chamber, scouring members freely disposed in said spaces for scouring said spaces, a liquid inlet of said first chamber for conducting said liquid, from which said material is to be separated, into said first chamber to fill said first chamber up to a level at which said liquid contacts the lowermost portion of said wall, driving means for turning said wall about said axis to cause said liquid from which said material is to be separated to form a layer of liquid on said wall in said first chamber, a vapour outlet of said first chamber for conducting out of said first chamber a vapour formed by evaporation of said liquid in said first chamber, a compressor connected downstream of said vapour outlet for compressing said vapour and thus increasing the temperature thereof, a vapour inlet of said second chamber connected downstream of said compressor for conducting the heated vapour into said second chamber in which said heated vapour condenses on said wall portion and thus causes evaporation of liquid of said layer, a liquid outlet of said second chamber for conducting the condensate out of said second chamber, and scraper means mounted in said first chamber adjacent to said wall and extending axially along said wall but angularly displaced from said lowermost portion for scraping from said wall on turning of said wall, the solid material remaining on said wall after evaporation of the liquid of said layer.

3. An apparatus for evaporating liquid to separate solid material from said liquid, comprising a heat-conducting cylindrical wall rotatable about its axis of revolution which is substantially horizontal, a first chamber bounded in part by the outside peripheral surface of said wall and by a surrounding casing, a second chamber bounded by the inside peripheral surface of said wall and disposed therewithin, radially inner sheeting forming an inner part of said wall and providing said inside peripheral surface and of constant circular cross-section, radially outer sheeting forming an outer part of said wall and providing said outside peripheral surface and attached to said inner sheeting, portions of said inner sheeting and portions of said outer sheeting defining therebetween annular closed spaces between said inner sheeting and said outer sheeting, portions of said inner sheeting defining ports therethrough interconnecting said spaces with said second chamber, a liquid inlet of said first chamber for conducting said liquid, from which said material is to be separated, into said first chamber to fill said first chamber up to a level at which said liquid contacts the lowermost portion of said wall, driving means for turning said wall about said axis to cause said liquid from which said material is to be separated to form a layer of liquid on said wall in said first chamber, a vapour outlet of said first chamber for conducting out of said first chamber a vapour formed by evaporation of said liquid in said first chamber, a compressor connected downstream of said vapour outlet for compressing said vapour and thus increasing the temperature thereof, a vapour inlet of said second chamber connected downstream of said compressor for conducting the heated vapour into said second chamber in which said heated vapour condenses on said wall portion and thus causes evaporation of liquid of said layer, a liquid outlet of said second chamber for conducting the condensate out of said second chamber, and scraper means mounted in said first chamber adjacent to said wall and extending along said wall but spaced from said lowermost portion for scraping from said wall on turning of said wall the solid material remaining on said wall after evaporation of the liquid of said layer.

4. An apparatus according to claim 3, wherein said outer sheeting is of triangular section in a plane containing the axis of said wall.

5. An apparatus according to claim 3, wherein said outer sheeting is of rectangular section in a plane containing the axis of said wall.

6. An apparatus according to claim 3, wherein said outer sheeting is of sinusoidal section in a plane containing the axis of said wall.

References Cited

UNITED STATES PATENTS

| | | | |
|---|---|---|---|
| 1,501,515 | 7/1924 | Testrup | 159—24 X |
| 1,530,439 | 3/1925 | Testrup et al. | 159—12 X |
| 2,823,742 | 2/1958 | Ludin et al. | 159—24 |

FOREIGN PATENTS

| | | |
|---|---|---|
| 96,824 | 5/1924 | Austria. |
| 909,016 | 4/1946 | France. |
| 1,001,206 | 2/1952 | France. |
| 15,631 | 12/1901 | Sweden. |

NORMAN YUDKOFF, *Primary Examiner.*

J. SOFER, *Assistant Examiner.*